(12) United States Patent
Jeong et al.

(10) Patent No.: US 9,519,359 B2
(45) Date of Patent: Dec. 13, 2016

(54) TOUCH INPUT APPARATUS INCLUDING ANNULAR OPEN OR CLOSED LOOP GROUND PLATE, WITH OR WITHOUT SLITS, POSITIONED AROUND A MAGNETIC CORE, FOR DECREASING EDDY LOSS

(71) Applicant: LG DISPLAY CO., LTD., Seoul (KR)

(72) Inventors: IlDoo Jeong, Seoul (KR); HaZoong Kim, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/481,465

(22) Filed: Sep. 9, 2014

(65) Prior Publication Data

US 2015/0097806 A1    Apr. 9, 2015

(30) Foreign Application Priority Data

Oct. 8, 2013    (KR) ........................ 10-2013-0120072

(51) Int. Cl.
| | |
|---|---|
| *G06F 3/0354* | (2013.01) |
| *G06F 3/044* | (2006.01) |
| *G06F 3/046* | (2006.01) |
| *G06F 3/038* | (2013.01) |
| *G06F 3/033* | (2013.01) |
| *G08C 21/00* | (2006.01) |
| *G06F 3/0488* | (2013.01) |

(52) U.S. Cl.
CPC .......... *G06F 3/03545* (2013.01); *G06F 3/044* (2013.01); *G06F 3/033* (2013.01); *G06F 3/0383* (2013.01); *G06F 3/046* (2013.01); *G06F 3/04883* (2013.01); *G08C 21/00* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 4,672,154 A | * | 6/1987 | Rodgers | .............. G06F 3/03545 178/19.07 |
| 4,868,351 A | | 9/1989 | Watanabe et al. | |
| 4,996,392 A | * | 2/1991 | Tagawa | .............. G01R 33/0352 178/19.03 |
| 5,534,671 A | | 7/1996 | Gierut et al. | |
| 5,540,800 A | | 7/1996 | Qian | |
| 2008/0106520 A1 | | 5/2008 | Free et al. | |
| 2008/0149402 A1 | | 6/2008 | Vos | |
| 2008/0150917 A1 | * | 6/2008 | Libbey | .................... G06F 3/046 345/179 |
| 2008/0150918 A1 | | 6/2008 | Hagen et al. | |
| 2008/0156546 A1 | | 7/2008 | Hauck | |

(Continued)

FOREIGN PATENT DOCUMENTS

| | | |
|---|---|---|
| EP | 0722150 A1 | 7/1996 |
| EP | 2077489 A1 | 7/2009 |

(Continued)

*Primary Examiner* — Adam R Giesy
*Assistant Examiner* — Karin Kiyabu
(74) *Attorney, Agent, or Firm* — Birch, Stewart, Kolasch & Birch, LLP

(57) ABSTRACT

The present invention provides an input apparatus which can include a conductivity tip, a coil electrically connected to the tip, and a ground plate electrically connected to the coil and forming an open loop in a circumference direction of the coil.

12 Claims, 12 Drawing Sheets

(56) References Cited

U.S. PATENT DOCUMENTS

| | | | |
|---|---|---|---|
| 2008/0158848 A1* | 7/2008 | Free | H05K 9/0075 361/818 |
| 2009/0166100 A1* | 7/2009 | Matsubara | G06F 3/03545 178/18.06 |
| 2014/0104224 A1* | 4/2014 | Ih | G06F 3/044 345/174 |
| 2016/0209957 A1* | 7/2016 | Jung | G06F 3/044 |

FOREIGN PATENT DOCUMENTS

| | | |
|---|---|---|
| JP | 5-127801 A | 5/1993 |
| JP | 5-241715 A | 9/1993 |
| JP | 8-88220 A | 4/1996 |
| JP | 10-312777 A | 11/1998 |
| JP | 11-102667 A | 4/1999 |
| JP | 2005-529414 A | 9/2005 |
| JP | 2008/152640 A | 7/2008 |
| WO | WO 03/105072 A2 | 12/2003 |
| WO | WO 03/105073 A2 | 12/2003 |

* cited by examiner

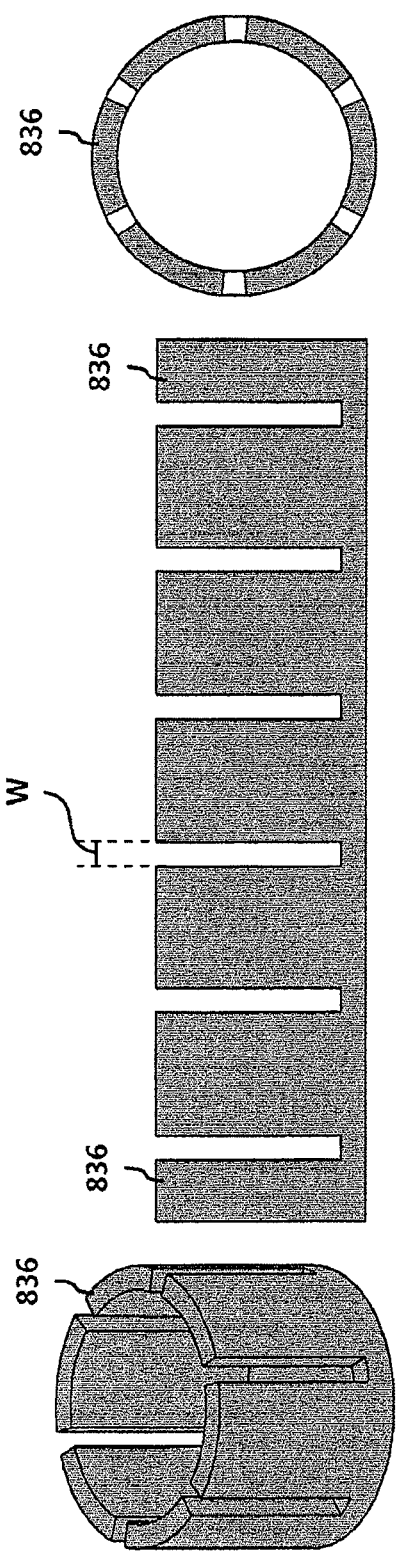

TOUCH INPUT APPARATUS INCLUDING ANNULAR OPEN OR CLOSED LOOP GROUND PLATE, WITH OR WITHOUT SLITS, POSITIONED AROUND A MAGNETIC CORE, FOR DECREASING EDDY LOSS

CROSS-REFERENCE TO RELATED APPLICATION

This application claims priority from and the benefit under 35 U.S.C. §119(a) of Korean Patent Application No. 10-2013-0120072, filed on Oct. 8, 2013, which is hereby incorporated by reference for all purposes as if fully set forth herein.

BACKGROUND OF THE INVENTION

1. Field of the Invention

The present invention relates to a touch input apparatus.

2. Description of the Background Art

With the development of information society, various types of requirements for a display device for displaying an image are increasing, and recently, various display devices, such as a Liquid Crystal Display (LCD), a Plasma Display Panel (PDP) and an Organic Light Emitting Diode Display Device (OLED), are being used.

A touch input system enabling a user to easily input information or an instruction may be further included in the display device. The touch input system recognizes a contact between a user's body or an additional input apparatus and the display device, and receives the user's information or the user's instruction. Recently, the additional input apparatus is being used a lot in order to receive a more exact input.

The additional input apparatus mainly uses a method for transferring an electromagnetic signal to the display device. The input apparatus transmits the electromagnetic signal to the display device by using an electromagnetic signal generating circuit, and the display device recognizes the transmitted electromagnetic signal by using an electromagnetic signal receiving circuit such as an antenna. The electromagnetic signal may be decreased or blocked by a peripheral device. Specially, the electromagnetic signal may form an eddy current in a metal plate, and may be decreased in the form of an eddy loss. When the electromagnetic signal is decreased like this, the signal recognition by the display device is weak, and thus the touch sensitivity decreases.

SUMMARY OF THE INVENTION

An aspect of the present invention is to provide a technology for transferring an electromagnetic signal generated from an input apparatus to a display device with less loss.

Another aspect of the present invention is to provide a technology for decreasing an eddy loss of an electromagnetic signal generated from an input apparatus.

In accordance with an aspect of the present invention, there is provided an input apparatus including: a conductivity tip; a coil electrically connected to the tip; and a ground plate electrically connected to the coil, and forming an open loop in a circumference direction of the coil.

In accordance with another aspect of the present invention, there is provided an input apparatus including: a conductivity tip; a coil electrically connected to the tip; and a ground plate electrically connected to the coil and including at least one slit.

As described above, according to the present invention, an input apparatus may transfer an electromagnetic signal to a display device with less loss. Thus, there is an effect of increasing a touch sensitivity of the display device.

In addition, according to the present invention, there is an effect of driving an input apparatus with a less energy because an eddy loss of an electromagnetic signal generated from the input apparatus decreases. According to such an effect, an additional power device may not be needed for the input apparatus.

BRIEF DESCRIPTION OF THE DRAWINGS

The above and other objects, features and advantages of the present invention will be more apparent from the following detailed description taken in conjunction with the accompanying drawings, in which:

FIGS. 8A to 8C are views illustrating the ground plate of FIG. 5 according to a third embodiment of the present invention;

DETAILED DESCRIPTION OF THE EMBODIMENTS

Figure 1:
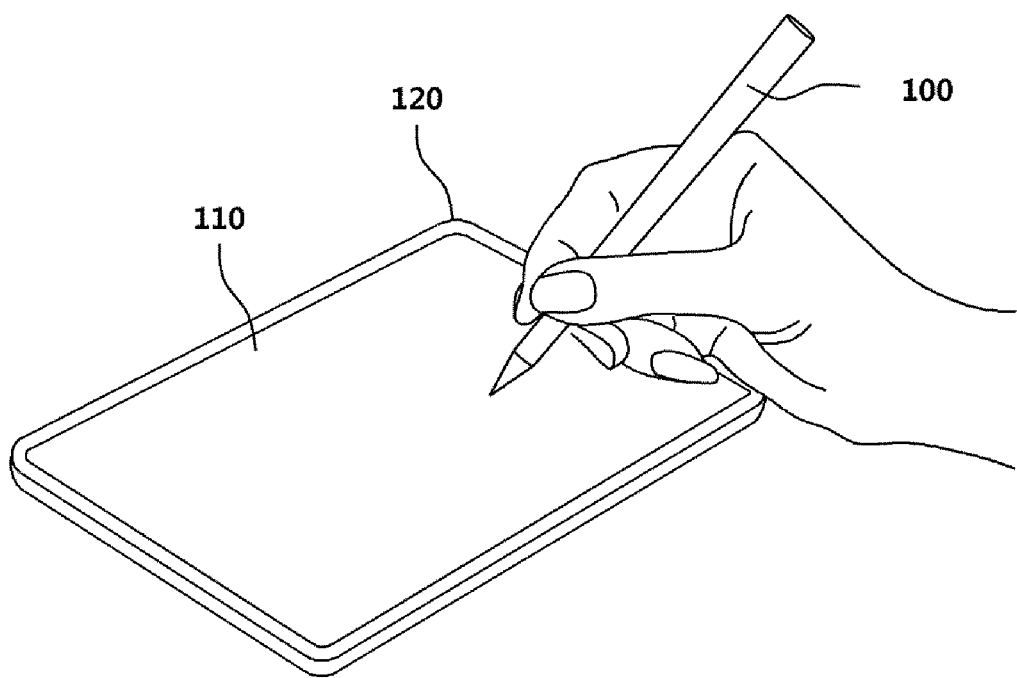
FIG. 1 is a view illustrating a touch input system through an input apparatus according to an embodiment of the present invention.

Hereinafter, preferred embodiments of the present invention will be described with reference to the accompanying drawings. In the following description, the same elements will be designated by the same reference numerals although they are shown in different drawings. Further, in the following description of embodiments of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. In the case that it is described that a certain structural element "is connected to", "is coupled with", or "is in contact with" another structural element, it should be interpreted that another structural element may "be connected to", "be coupled with", or "be in contact with" other structural elements as well as that the certain structural element is directly connected to or is in direct contact with another structural element. Likewise, when it is described that a certain element is formed "on" or "under" another element, it should be understood that the certain element may be formed either directly or indirectly via a still another element on or under another element.

FIG. 1 is a view illustrating a touch input system through an input apparatus. The touch input system is a system that recognizes a contact between the input apparatus or a user's body and a display device in order to receive a user's input.

The touch input system may include an input apparatus 100 and a display device 120 as shown in FIG. 1. The display device 120 may further include a touch panel 110 capable of recognizing the contact of the input apparatus 100 or the user's body. All the components of the touch input system, in this and other embodiments, are operatively coupled and configured FIG. 2 is a block diagram illustrating the touch input system according to an exemplary embodiment.

Figure 2:
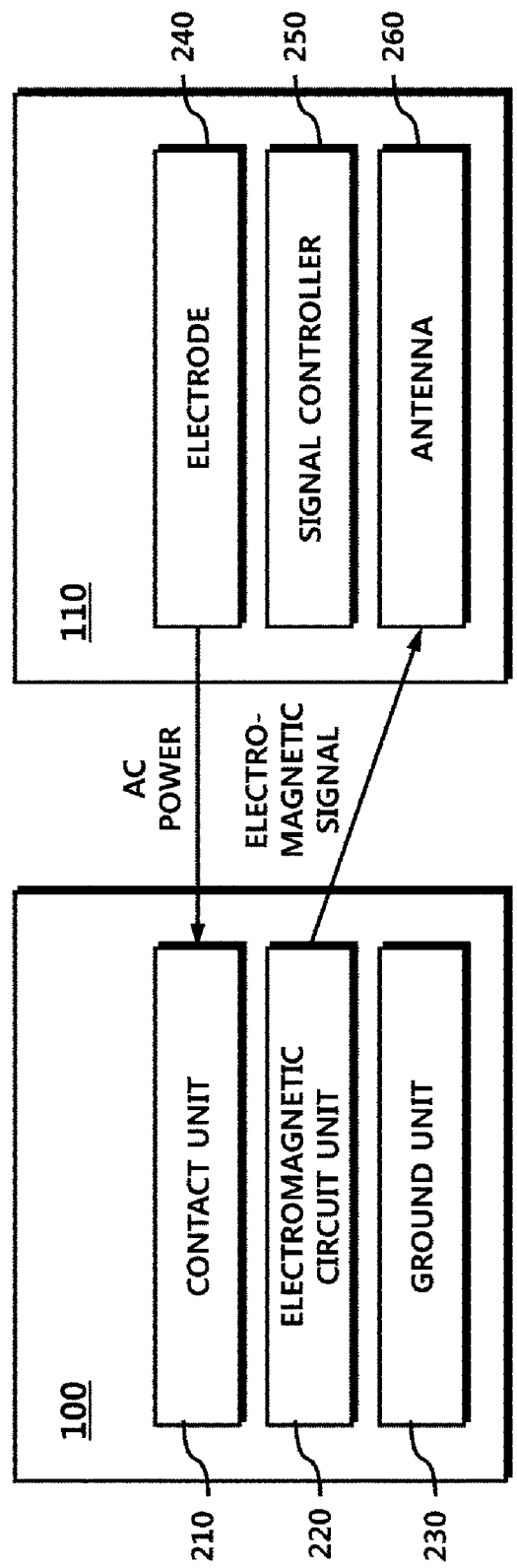
FIG. 2 is a block diagram illustrating the touch input system according to an embodiment of the present invention.

In FIG. 2, the input apparatus 100 includes a contact unit 210, an electromagnetic circuit unit 220 and a ground unit 230. In addition, the touch panel 110 may include an electrode 240, a signal controller 250 and an antenna 260.

In the touch panel 110, the signal controller 250 outputs an alternating current (AC) power to the input apparatus 100 with the electrode 240. In addition, the signal controller 250 processes a signal received from the input apparatus 100 through the antenna 260 to recognize a touch.

In the input apparatus 100, the contact unit 210 directly contacts with the touch panel 110. At this time, the touch panel 110 may include at least two of the electrodes 240, and the electrodes 240 may output the AC power. The contact unit 210 may include a conductivity tip, and may form a capacitor with the electrode 240 of the touch panel 110. The capacitor may be formed with two electrode plates and an insulating material between the electrode plates. The conductivity tip of the contact unit 210 and the electrode 240 of the touch panel 110 may form the two electrode plates, and a material (e.g., a glass film or an air of the touch panel 110) between the conductivity tip and the electrode 240 may be the insulating material.

The contact unit 210 may receive the AC power output to the electrodes 240 of the touch panel 110 while forming the capacitor with the touch panel 110. The AC power flows through the electromagnetic circuit unit 220 and the ground unit 230.

The electromagnetic circuit unit 220 converts the AC power transferred through the contact unit 210 into an electromagnetic signal (e.g., a magnetic signal) according to an electromagnetic induction and transmits the electromagnetic signal to the touch panel 110. The electromagnetic circuit unit 220 may induce the electromagnetic signal by using a coil. According to Faraday's law, an electromotive force may be formed in a circuit in proportion to a time change rate of a magnetic field passing through a circuit, and inversely, when a current flows through the circuit, the magnetic field passing through the circuit may be formed. The electromagnetic circuit unit 220 may form the magnetic field by an AC current flowing to the coil included in the electromagnetic circuit unit 220, the magnetic field is transferred to the antenna 260 of the touch panel 110, and thus the touch panel 110 may recognize the touch.

The ground unit 230 forms a path for the AC power. The ground unit 230 may form a closed circuit with the touch panel 110 through the user's body. Alternatively, the ground unit 230 may form the closed circuit with the touch panel 110 through an additional line connected to the touch panel 110. As described above, the ground unit 230 forms the closed circuit, and thus the path through which the AC power input through the contact unit 210 flows to the touch panel 110 again is formed.

Figure 3:
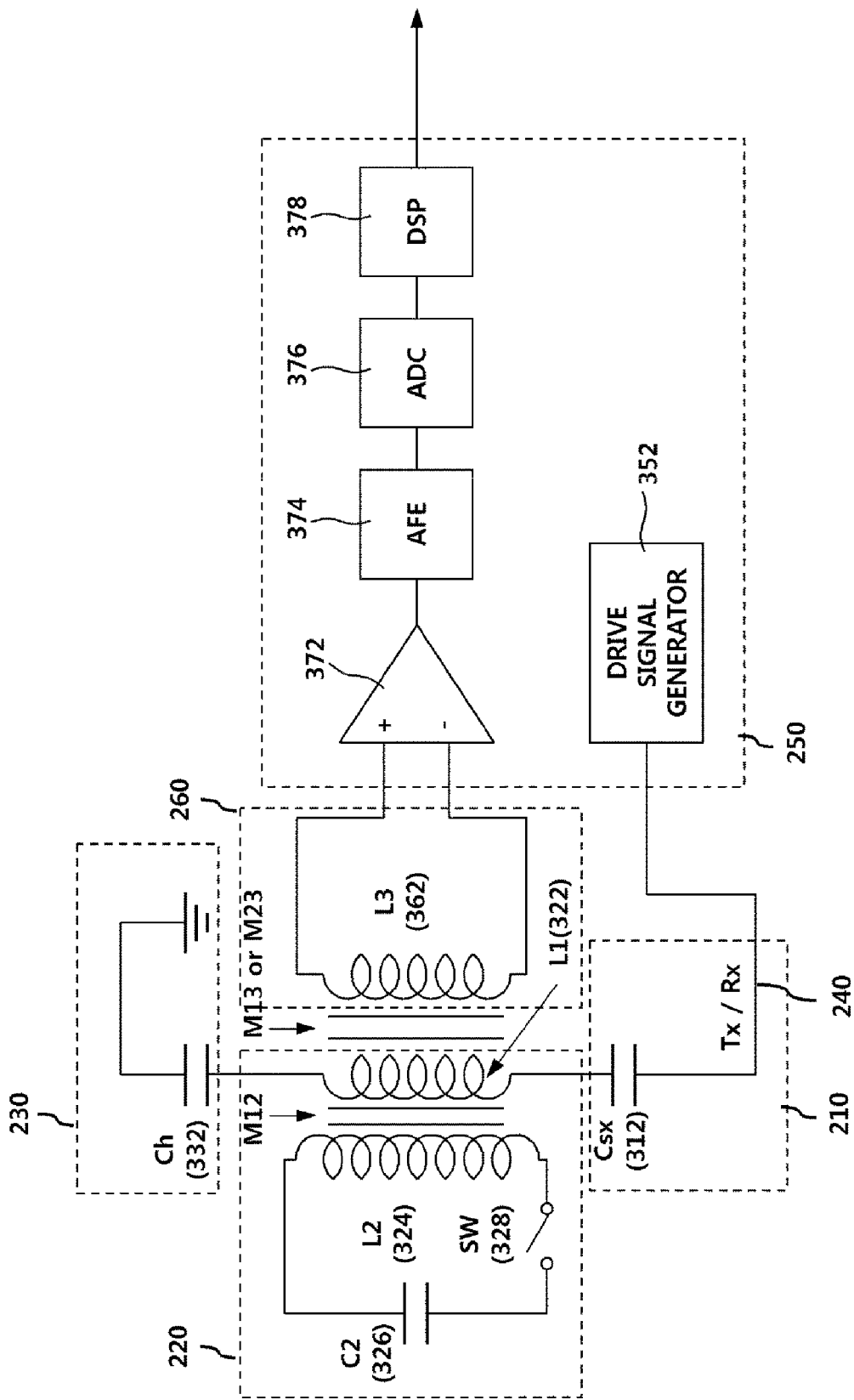
FIG. 3 is a circuit diagram illustrating the touch input system according to an embodiment of the present invention.

FIG. 3 is a circuit diagram illustrating the touch input system according to an exemplary embodiment.

Referring to FIG. 3, the contact unit 210 includes the conductivity tip, and forms the capacitor (referred to as a sensing capacitor for distinguishing the capacitor formed by the contact unit 210 from another capacitor) 312 between the contact unit 210 and the electrode 240 of the touch panel 110. At this time, the AC power output through the electrode 240 by the signal controller 250 flows to the sensing capacitor 312 and the AC power is transferred to the electromagnetic circuit unit 220.

The electromagnetic circuit unit 220 may include a first coil (L1) 322 electrically connected to the contact unit 210, a second coil 324 magnetically connected to the first coil 322, and a resonance capacitor 326 generating a resonance between the second coil 324 and the resonance capacitor 326.

The AC power input through the sensing capacitor 312 flows to the first coil 322 electrically connected to the sensing capacitor 312. And, the AC power is transferred to the second coil 324 combined with the first coil 322 in a mutual inductance M12 according to the electromagnetic inducement. The AC power flowing through the second coil 324 forms a resonance current between the second coil 324 and the resonance capacitor 326.

Referring to FIG. 3, a damping resistance is not generated, and thus the resonance current between the second coil 324 and the resonance capacitor 326 may be continuously amplified by a new input. For example, when the AC power of a first period is transferred through the sensing capacitor 312, the second coil 324 and the resonance capacitor 326 form the resonance current by the AC power of the first period. In addition, when the AC power of the next period is transferred, the resonance current of the second coil 324 and the resonance capacitor 326 is amplified because an additional resonance current generated by the new AC power is added to the previously formed resonance current. When the AC power is input continuously, the resonance current between the second coil 324 and the resonance capacitor 326 is continuously amplified.

The AC power generated from a signal generator 352 may have a period substantially identical to a resonance period, in order to activate the resonance between the second coil 324 and the resonance capacitor 326. For example, the signal generator 352 may output the AC power having a frequency substantially identical to a frequency obtained by $f=1/[2\pi*(L2*C2)^0.5]$ to transmission/reception (Tx/Rx) electrodes 240. The AC power may have a sine wave, but is not limited thereto. Alternatively, the AC power may have a square waveform.

The AC current flowing through the first coil 322 or the resonance current flowing through the second coil 324 transfers the electromagnetic signal (e.g., the magnetic signal) to an antenna circuit (L3) 362 of the touch panel 110 combined by a mutual inductance M13 or M23 according to the electromagnetic inducement.

The electromagnetic signal input through the antenna circuit 362 is amplified by an amplifier 372, filtered by a filter 374, and converted into a digital signal by an analog digital converter 376. The converted digital signal is processed by a digital signal processor 378, and thus the touch panel 110 recognizes the touch of the input apparatus 100.

Meanwhile, a closed circuit enabling the AC power to flow to the touch panel again should be formed so that the AC power flows to the sensing capacitor 312. For this, the electromagnetic circuit unit 220 is electrically connected to the ground unit 230, and the ground unit 230 is formed in a ground state.

The input apparatus 100 is an apparatus operated by the user's body, and contacts the user's body. The ground unit 230 forms a ground surface with the user's body, and flows the AC power to the ground through the ground surface and the user. Referring to FIG. 3, a human capacitor (Ch) 332 may be formed between the ground and the user, the ground unit 230 enables the AC power to flow to the ground through the human capacitor 332 by the contact with the user's body.

The touch panel 110 may form the ground and the capacitor through another path (not shown), and the input apparatus 100 and the touch panel 110 form the closed circuit for the AC power through the capacitor.

In addition, a switch (SW) 328 may be further included between the second coil 324 and the resonance capacitor 326. The switch 328 may open or close a resonance path so that the resonance current is generated or not according to the need.

Meanwhile, the ground unit 230 may include a ground plate (refer to 536 of FIG. 5), and the ground plate may be a magnetic substance (e.g., a metal plate). Therefore, the electromagnetic signal generated from the electromagnetic circuit unit 220 may decrease while generating an eddy loss.

The eddy loss generated in the ground plate is described below.

Figure 4:
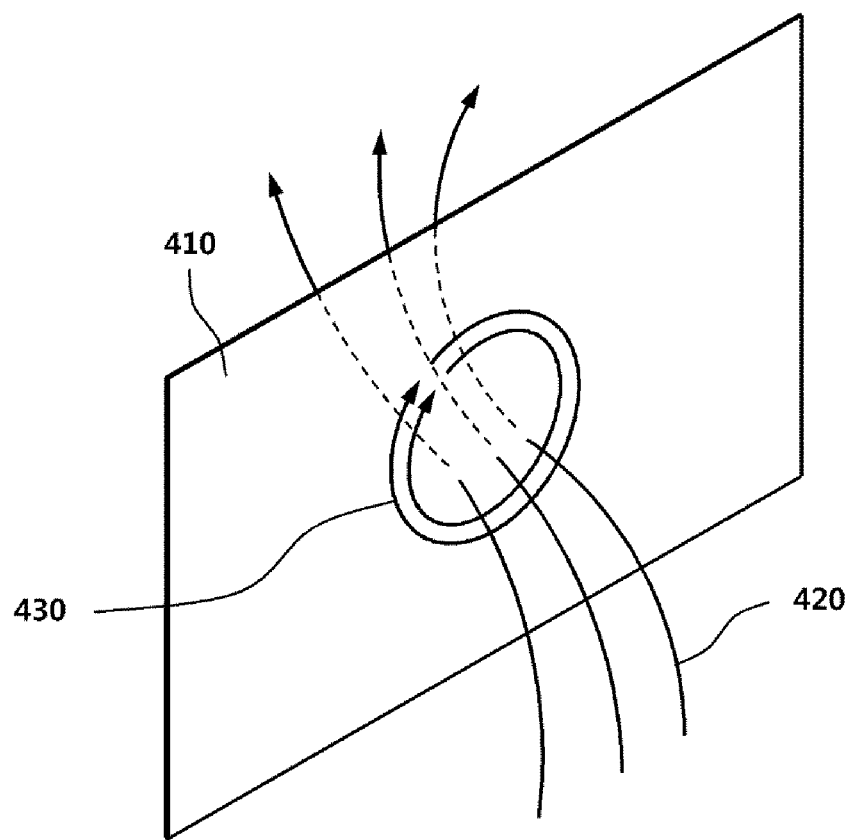
FIG. 4 is a view illustrating a generation of an eddy current by a magnetic field passing through a metal plate according to an embodiment of the present invention.

FIG. 4 is a view illustrating a generation of an eddy current by the magnetic field passing through the metal plate.

Referring to FIG. 4, when a magnetic flux 420 is changed in the magnetic substance such as a metal plate 410, the electromotive force is generated. A current having an eddy shape flows in the metal plate 410 by the electromotive force as shown in FIG. 4. This is referred to as the eddy current. A power loss is generated by the eddy current, and such a power loss is referred to as the eddy loss. The eddy loss blocks a flow of the magnetic flux, thus the eddy loss decreases the electromagnetic signal and generates heat in the metal plate 410.

The input apparatus 100 according to an exemplary embodiment decreases the eddy loss. For example, the ground unit 230 may include the ground plate, and the ground plate does not form a closed loop in a circumference direction of a coil. A flow of the eddy current in the circumference direction of the coil may be prevented by this shape of the ground plate, and thus the eddy loss of the input apparatus 100 decreases.

For another example, the ground unit 230 may include the ground plate, and the ground plate may include at least one slit. The ground plate has a shape in which a plurality of small plates are combined with the slit. A size of the plate where the eddy current is formed decreases by the shape of the ground plate, and thus the eddy loss of the input apparatus 100 decreases.

Hereinafter, the input apparatus 100 and the ground plate are described with the shapes of the input apparatus 100 and the ground plate as the central figures, in order to specifically describe an exemplary embodiment of decreasing the eddy loss.

Figure 5:
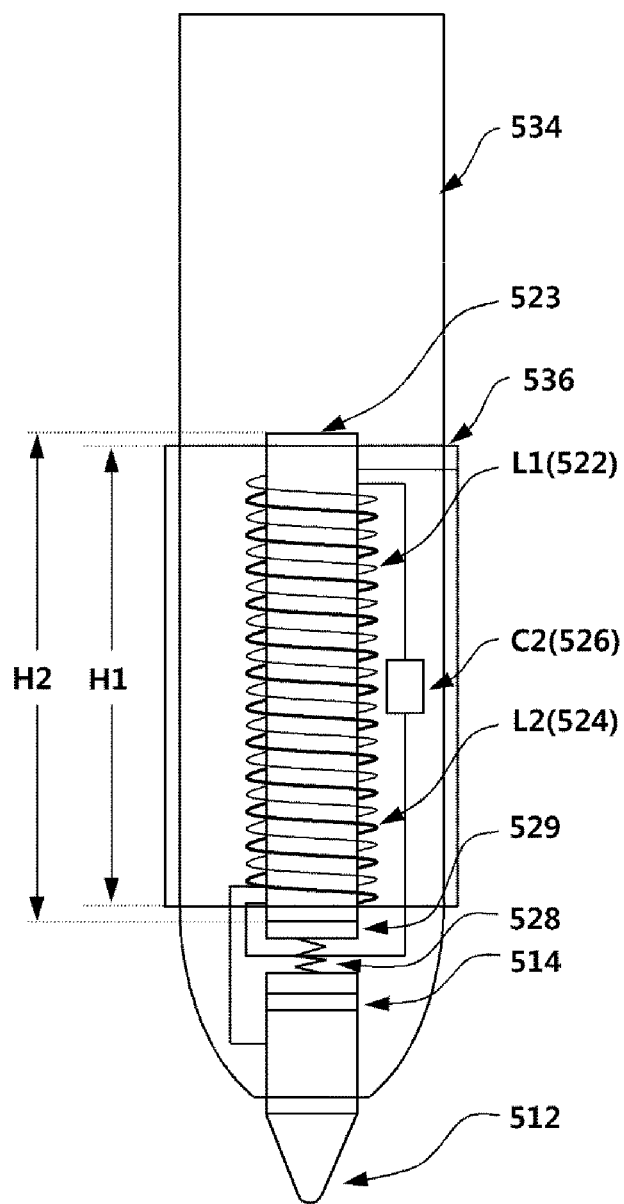
FIG. 5 is a view illustrating a shape of the input apparatus according to an embodiment of the present invention.

FIG. 5 is a view illustrating one example of the shape of the input apparatus according to an exemplary embodiment.

Referring to FIG. 5, the input apparatus 100 may include a conductivity tip 512, a first coil (L1) 522 connected to the conductivity tip 512, and a ground plate 536 electrically connected to the first coil 522.

In addition, the input apparatus 100 may further include a second coil 524 and a resonance capacitor 526 connected in series in order to additionally form a resonance circuit. The resonance circuit is for amplifying the electromagnetic signal, and may be omitted. In addition, an additional configuration described below may be omitted according to the need.

The input apparatus 100 may further include a magnetic core 523. The magnetic core 523 may form a magnetic path of the first coil 522 and increase an inductance of the first coil 522. In addition, the magnetic core 523 forms a path where a magnetic field formed in the first coil 522 is transferred to the antenna 260 of the touch panel 110. Thus the magnetic core 523 enables the electromagnetic signal to be transferred from the input apparatus 100 to the touch panel 110 well.

The magnetic core 523 strengthens a magnetic combination between the first coil 522 and the second coil 524. A mutual inductance M12 between the first coil 522 and the second coil 524 may increase according to the magnetic core 523.

The input apparatus 100 may further include two insulating films 514 and 529 in order to form an insulation between the magnetic core 523 and the conductivity tip 512, and may further include a switch 528 capable of operating a short circuit of the resonance between the second coil 524 and the resonance capacitor 526. Meanwhile, the switch 528 may include an elasticity member (e.g., a spring). The switch 528 may determine whether the input apparatus 100 contacts with the touch panel 110 by recognizing a pressure transferred through the conductivity tip 512, and may operate the short circuit or an open of the resonance circuit according to the determination.

The input apparatus 100 may further include a non-conductivity pail 534 having a pen shape surrounding the first coil 522. The input apparatus 100 may have the pen shape familiar to the user through the pen shape of pail 534.

The ground plate 536 may be located on a portion of an outer surface of the pen shape of pail 534. The ground plate 536 may form a ground by contacting with a user's hand, and the ground plate 536 may be located at an area (e.g., a front end of the pen) where the user's hand is mainly placed.

As described above, the first coil 522 may further include the magnetic core 523 inside of the first coil 522 in an axis direction (a longitudinal direction of the pen shape of the pail 534) of the first coil 522. A length H1 of the axis direction of the ground plate 536 may be equal to or shorter than a length H2 of the axis direction of the magnetic core 523. In addition, the ground plate 536 may be located between both ends of the magnetic core 523 in the axis direction. The magnetic core 523 forms the magnetic path where the magnetic field formed in the first coil 522 or the second coil 524 flows. The ground plate 536 may be located between the both ends of the magnetic core 523 with the length shorter than the length of the magnetic core 523, in order to avoid a direct path of the magnetic path. Thus, a loss of the electromagnetic signal formed by the first coil 522 or the second coil 524, incurred because of the blocking by the ground plate 536, decreases.

In addition, the ground plate 536 may be disconnected or an area of the ground plate 536 may decrease, in order to minimize the eddy loss.

Figure 6C:
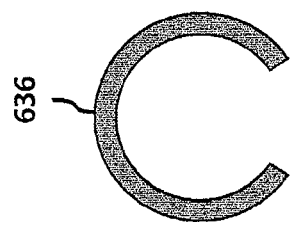
FIGS. 6A to 6C are views illustrating a ground plate of FIG. 5 according to a first embodiment of the present invention.
Figure 6B:
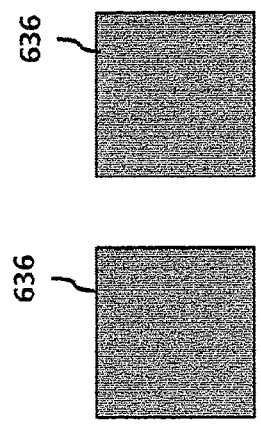
Figure 6A:
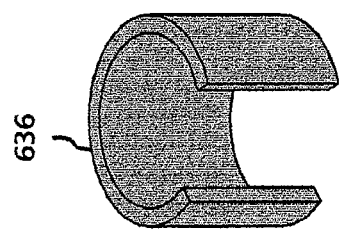

FIGS. 6A to 6C are views illustrating the ground plate of FIG. 5 according to a first exemplary embodiment.

In FIGS. 6A to 9C, FIGS. 6A, 7A, 8A and 9A are cross-sectional views of the ground plate, FIGS. 6B, 7B, 8B and 9B are spreaded view of the ground plate, and FIGS. 6C, 7C, 8C and 9C are top side views of the ground plate.

Referring to FIGS. 6A to 6C, a ground plate 636 has a shape of forming an open loop in a circumference direction of the first coil 522. Because of such a shape (a disconnected shape), the eddy current is not generated in the circumference direction of the first coil 522.

Figure 7C:
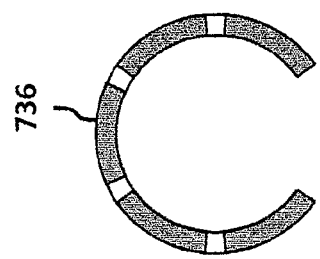
FIGS. 7A to 7C are views illustrating the ground plate of FIG. 5 according to a second embodiment of the present invention.
Figure 7B:
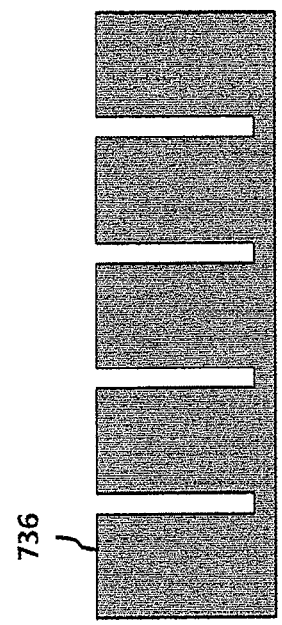
Figure 7A:
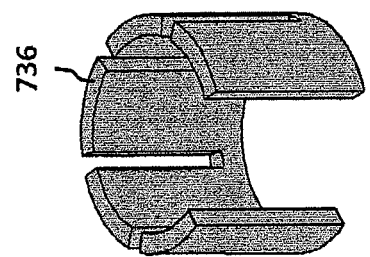
Figure 9:
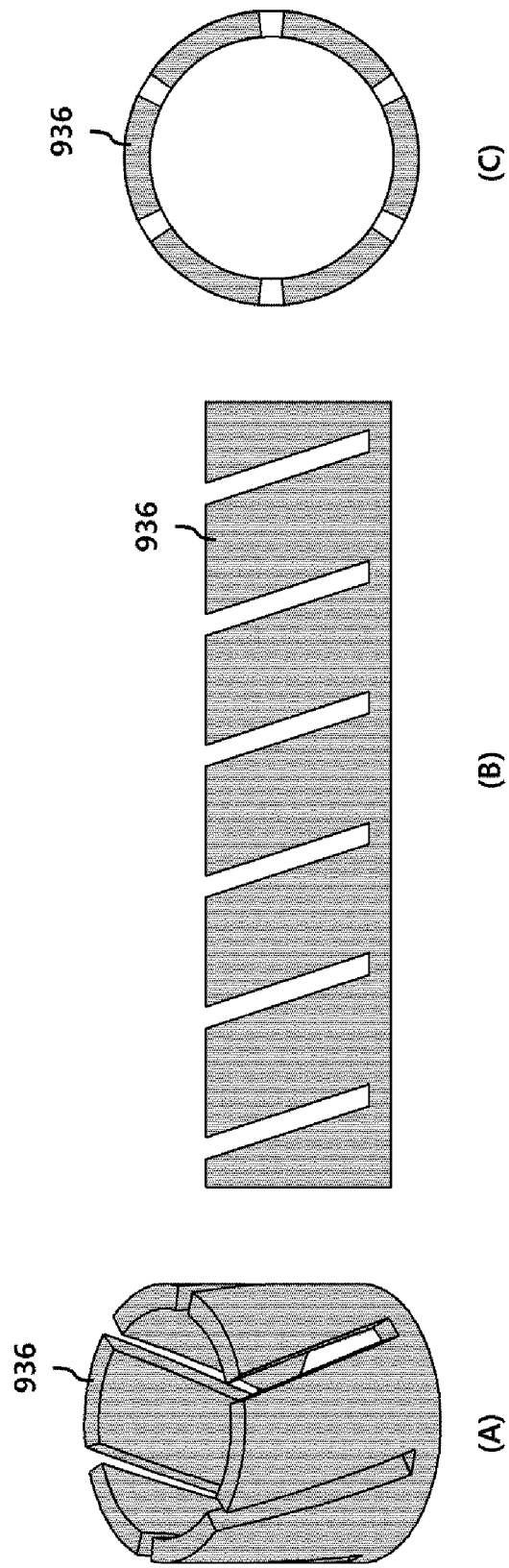
FIGS. 9A to 9C are views illustrating the ground plate of FIG. 5 according to a fourth embodiment of the present invention.

FIGS. 7A to 7C are views illustrating the ground plate of FIG. 5 according to a second exemplary embodiment.

Referring to FIGS. 7A to 7C, a ground plate 736 forms the open loop in the circumference direction and includes at least one slit. The slit may be formed in an axis direction of the ground plate 736, and thus the eddy current of the axis direction may be minimized.

In the above-mentioned exemplary embodiments, the ground plate forms the open loop in the circumference direction, but the ground plate may minimize the eddy current by another structure while forming a closed loop in the circumference direction.

FIGS. 8A to 8C are views illustrating the ground plate of FIG. 5 according to a third exemplary embodiment.

Referring to FIGS. 8A to 8C, a ground plate 836 may include at least one of the slits while forming the closed loop in the circumference direction. At this time, an area of the ground plate 836 may be minimized by widening a distance between the slits. But, in order to prevent a non-contact between the ground plate 836 and the user's hand, incurred because the user's hand is positioned at only the slit, the size (W) of the slit may be equal to or shorter than 20 mm which is equal to or shorter than a user's finger.

FIGS. 9A to 9C are views illustrating the ground plate of FIG. 5 according to a fourth exemplary embodiment.

Referring to FIGS. 9A to 9C, a ground plate 936 includes at least one of the slits, and a certain angle is formed between the slit and the axis direction of the ground plate 936. As described above, the slit forms the certain angle with respect to the axis direction, and thus the eddy currents formed in the axis direction and the circumference direction may be controlled in certain rates, respectively.

Figure 10:
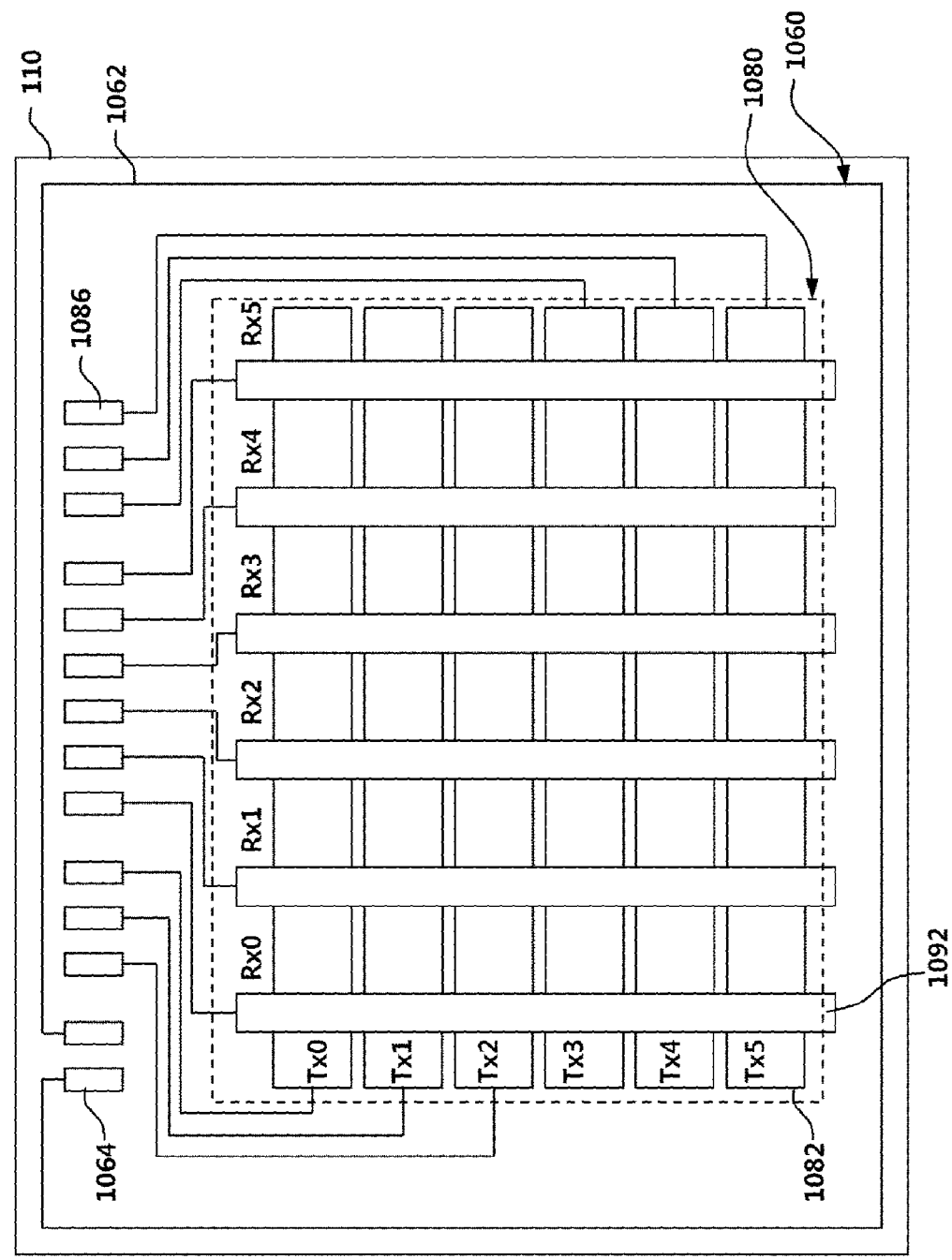
FIG. 10 is a view illustrating a configuration of a touch panel corresponding to the input apparatus according to an embodiment of the present invention.

FIG. 10 is a view illustrating a configuration of the touch panel corresponding to the input apparatus according to an exemplary embodiment.

Referring to FIG. 10, the touch panel 110 may include an active area 1080 where the Tx/Rx electrodes are formed, and an antenna 1060 including an antenna circuit 1062 surrounding a peripheral area of the active area 1080.

The touch panel 110 may include the plurality of electrodes, referring to FIG. 10, the Tx electrode is located in a horizontal direction, and the Rx electrode is located in a vertical direction. The Tx electrode is an electrode outputting a driving signal in a static capacity method touch panel, and the Rx electrode is an electrode sensing a touch position by recognizing the driving signal. In this respect, the electrodes in the touch panel 110 are referred to as the Tx/Rx electrodes, but the present invention is not limited thereto. Alternatively, the present invention may include a structure of outputting the AC power with the electrodes without division of the Tx/Rx electrodes. Hereinafter, the present invention is described by using the structure of the Tx/Rx electrodes.

Figure 11:
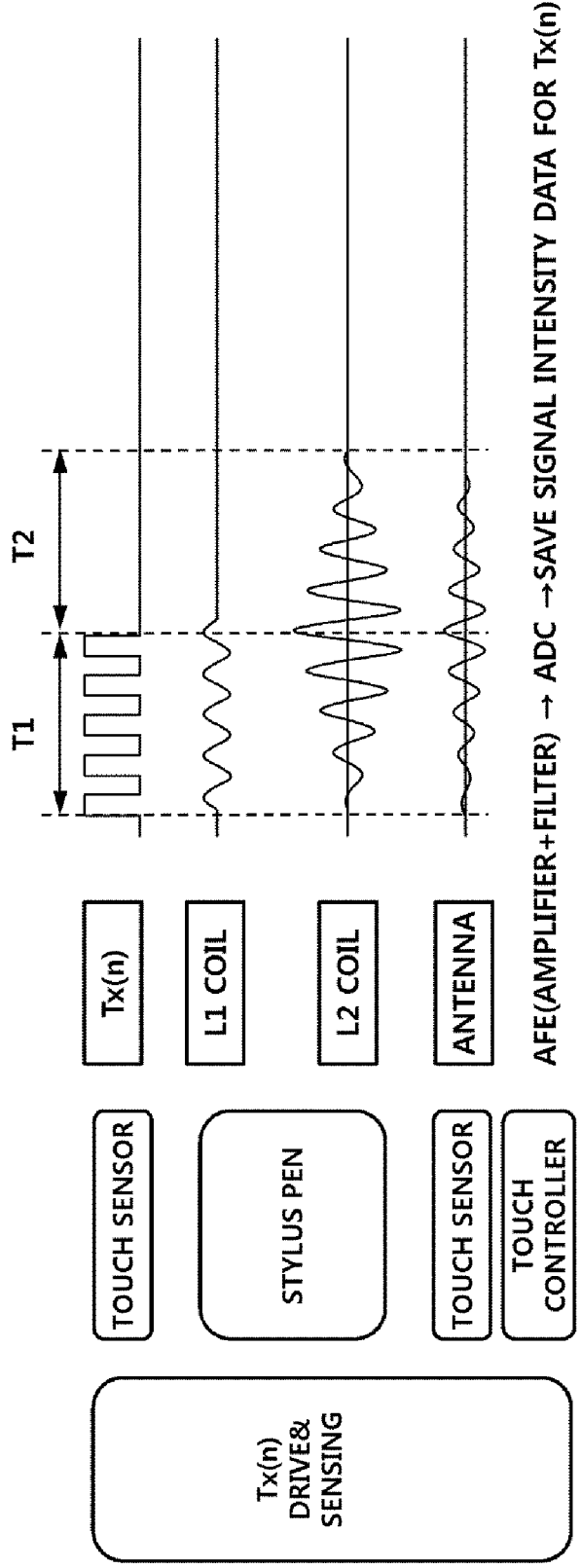
FIG. 11 is a signal waveforms diagram of the touch input system according to an embodiment of the present invention.

In the touch panel 110, the electrodes include a point where the electrodes cross each other for displaying one point. For example, as shown in FIG. 11, when the electrode of the horizontal direction and the electrode of the vertical direction cross each other, one point is displayed in each of the crossing points. The touch panel 110 recognize the electromagnetic signal received from the input apparatus 100 at each of the crossing points to determine which points are touched by the input apparatus 100.

More specifically, the touch panel 110 sequentially outputs the AC power to the entire electrodes. For example, the touch panel 110 may sequentially output the AC power to a Tx0 electrode to a Tx5 electrode, and may sequentially output the AC power to an Rx0 electrode to an Rx 5 again.

At this time, it is assumed that the conductivity tip 512 contacts a point where the Tx5 electrode 1082 and the Rx0 electrode 1092 cross. In this case, the conductivity tip 512 of the input apparatus 100 forms the sensing capacitor 312 with the Tx5 electrode 1082 and the Rx0 electrode 1092. The touch panel 110 sequentially outputs the AC power to the whole of the electrodes, when the AC power is output to electrodes except for the Tx5 electrode 1082 and the Rx0 electrode 1092, the sensing capacitor is not formed with the corresponding electrodes, and thus the AC power is not transferred to the input apparatus 100. Therefore, the input apparatus 100 does not transmit the electromagnetic signal to the touch panel 110. In contrast, when the touch panel 110 outputs the AC power to the Tx5 electrode 1082 or the Rx0 electrode 1092, the sensing capacitor is formed with the corresponding electrodes, and thus the AC power is transferred to the input apparatus 100. In addition, the transferred AC power transmits the electromagnetic signal to the antenna circuit 1062 of the touch panel 110 in the electromagnetic inducement method through the first coil 522 or the resonance circuit. Finally, when the touch panel 110 outputs the AC power to the Tx5 electrode 1082 and the Rx0 electrode 1092, the touch panel 110 recognizes the transmission of the electromagnetic signal to the antenna 1060 and recognizes that the input apparatus 100 touches the crossing point of the Tx5 electrode 1082 and the Rx0 electrode 1092.

Meanwhile, the Tx/Rx electrodes are connected to the signal generator 352 of the signal controller 250 through an electrode pad (e.g., an electrode pad 1086 of the Tx5 1082). The antenna circuit 1062 is connected to the amplifier 372 of the signal controller 250 through an antenna pad 1064.

FIG. 11 is a signal waveforms diagram of the touch input system according to an exemplary embodiment.

Referring to FIG. 11, the signal generator 352 of the signal controller 250 may output the AC power of a square waveform to a Tx(n) (n is an integer smaller than a number of the Tx electrodes) during a T1 period. The AC power is transferred to the first coil (L1) 522 through the conductivity tip 512 of the input apparatus 100 contacting with the Tx(n), and the AC power is transferred again to the second coil (L2) 524 magnetically combined to the first coil 522. The second coil 524 is connected to the resonance capacitor 526, and may amplify the AC power transferred through the first coil 522 through the resonance.

The AC power amplified in the second coil 524 is transferred to the antenna 1060 of the touch panel 110 according to the electromagnetic inducement. In addition, the amplifier 372 amplifies the signal, the filter 374 filters the signal, and the converter 376 converts the signal into the digital signal, sequentially, and the converter 376 finally transfers the digital signal to the signal processor 378. The signal processor 378 determines that the AC power is output to which electrode among the electrodes, determines that a received signal (the digital signal received from the converter 376) with respect to the corresponding AC output has a value equal to or higher than a certain level (e.g., a noise level), and thus the signal processor 378 recognizes the touch.

Meanwhile, the AC power of the signal processor 352 is output during only the T1 period, and the signal processor 378 may recognize the touch by using only a signal input during a T2 period. The AC power output during the T1 period may generate the magnetic signal in the touch panel 110. Because the magnetic signal is transferred to the antenna 1060, and the magnetic signal may be transferred to the signal processor 378 as a noise signal, the periods are divided into the T1 and T2 periods, the AC power is output during the T1 period and the signal processor 378 processes the signal during the T2 period as described above.

Figure 12A:
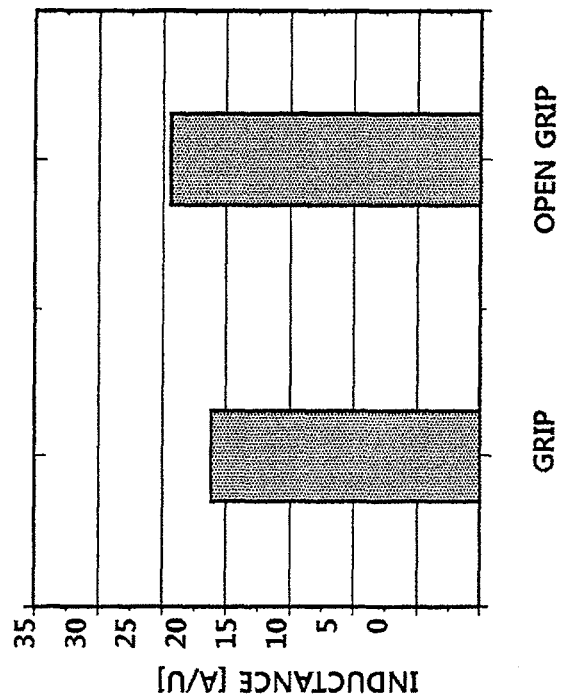
FIGS. 12A and 12B are graphs illustrating an inductance of the input apparatus according to an embodiment of the present invention.
Figure 12B:
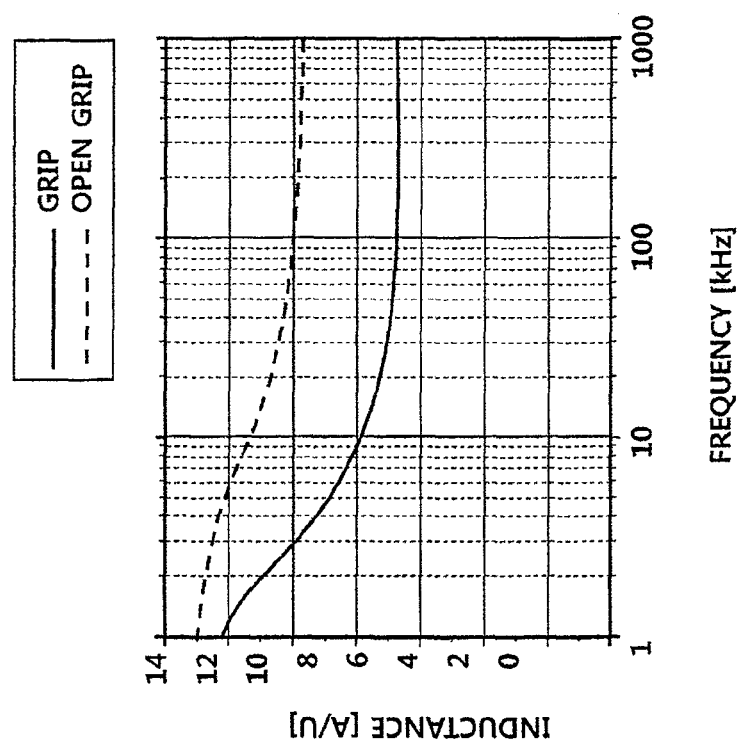

FIGS. 12A and 12B are graphs illustrating an inductance of the input apparatus according to an exemplary embodiment.

In FIGS. 12A and 12B, 'Grip' indicates the structure in which the ground plate forms the cylindrical closed loop in the circumference direction of the coil, and 'Open Grip' indicates the structure in which the ground plate forms the open loop in the circumference direction of the coil.

FIG. 12A is a graph illustrating the inductance of the first coil 522, and FIG. 12B is a graph illustrating an inductance value of the first coil 522 according to an inductance meter.

Referring to FIGS. 12A and 12B, the inductance in the case (Open Grip in FIGS. 12A and 12B) wherein the ground plate forms the open loop is higher than the inductance in the case (Grip in FIGS. 12A and 12B) wherein the ground plate forms the closed loop, with respect to the same first coil 522. This means that a magnetic field loss of the first coil is smaller in the open loop, and this is because the eddy loss decreases as described above.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. An input apparatus comprising:
   a conductivity tip;
   a coil electrically connected to the conductivity tip; and
   a ground plate electrically connected to the coil, and forming an open loop in a circumference direction of the coil,
   wherein the open loop includes an open portion that extends from one side of the ground plate to another side of the ground plate,
   wherein the ground plate further includes at least one slit that extends into a side of the ground plate, and
   wherein the open portion of the ground plate is different than the at least one slit in the ground plate,
   wherein the conductivity tip contacts with a surface of a touch panel outputting an alternating current (AC) power with at least one electrode, a capacitor is formed between the conductivity tip and the at least one electrode by the contact, and the AC power is transferred through the capacitor to the coil, and
   wherein the coil transmits an electromagnetic signal to an antenna of the touch panel according to an electromagnetic induction.

2. The input apparatus of claim 1, further comprising:
   a non-conductivity pail having a pen shape surrounding the coil,
   wherein the ground plate is located on a portion of an outer surface of the pail.

3. The input apparatus of claim 1, further comprising:
   a magnetic core formed in an axis direction of the coil, and an axis direction length of the ground plate is equal to or shorter than an axis direction length of the magnetic core.

4. The input apparatus of claim 3, wherein the ground plate is located between both ends of the magnetic core.

5. The input apparatus of claim 1, further comprising:
   a resonance circuit including a resonance coil magnetically combined with the coil via magnetic inductance between the coil and the resonance coil, and a resonance capacitor connected to the resonance coil in series.

6. The input apparatus of claim 1, wherein the ground plate includes a plurality of slits.

7. The input apparatus of claim 1, wherein the ground plate includes a plurality of parts separated by the slits, and wherein the parts are integrally connected to one another.

8. An input apparatus comprising:
   a conductivity tip;
   a coil electrically connected to the conductivity tip; and
   a ground plate electrically connected to the coil and including at least one slit,
   wherein the at least one slit extends into a side of the ground plate,
   wherein the conductivity tip contacts with a surface of a touch panel outputting an alternating current (AC) power with at least one electrode, a capacitor is formed between the conductivity tip and the at least one electrode by the contact, and the AC power is transferred through the capacitor to the coil, and
   wherein the coil transmits an electromagnetic signal to an antenna of the touch panel according to an electromagnetic induction.

9. The input apparatus of claim 8, wherein the at least one slit in the ground plate has a length equal to or shorter than 20 mm.

10. The input apparatus of claim 8, wherein the at least one slit in the ground plate forms a certain angle with respect to an axis direction of the ground plate.

11. The input apparatus of claim 8, wherein the ground plate includes a plurality of slits.

12. The input apparatus of claim 8, wherein the ground plate includes a plurality of parts separated by the slits, and wherein the parts are integrally connected to one another.

\* \* \* \* \*